PRODUCTION OF ORGANIC TRITHIOPHOSPHITES

Chisung Wu, South Charleston, W. Va., assignor to Union Carbide Corporation, a corporation of New York
No Drawing. Filed June 24, 1964, Ser. No. 377,525
20 Claims. (Cl. 260—971)

The invention relates to an improved process for producing organic trithiophosphites. In a particular aspect, the invention relates to a process for producing organic trithiophosphites by reacting elemental phosphorus with organic disulfides in the presence of a base catalyst and in a dipolar aprotic solvent reaction medium.

In U.S. Patent 2,542,370 (Stevens et al.) and in U.S. Patent 2,819,290 (McLeod et al.) there are disclosed processes for producing organic trithiophosphites by reacting elemental phosphorus with organic disulfide. In each of these patents, the reaction must be carried out at elevated temperatures in the range of from 150° C. to 250° C. for substantial periods of time. Both patents disclose that the reaction can be carried out in a reaction medium consisting of one or more hydrocarbon solvents such as petroleum fractions, naphtha, cycloparaffins, naphthalene, and the like. There are certain disadvantages found in the processes disclosed by both of these patents. For instance, in Stevens et al. the product contains impurities that cause discoloration and reduced yield, and the process can be carried out only at elevated temperatures (i.e., 150°–250° C.). The McLeod et al. patent was granted as an improvement over Stevens et al., the improvement being in the use of a cycloparaffin solvent which permitted a purer product to be made. However, the McLeod et al. process must also be carried out at elevated temperatures (150°–250° C.), and a study of the examples reveals that very high temperatures must be employed in order to complete the reaction within a reasonable length of time. For instance, Run No. 2 was conducted at 166° C., and required 72 hours. Even at 200° C., the reaction time required was 2 hours (Run No. 10), and the high temperature made necessary the use of 6 atmospheres of pressure.

In accordance with the present invention, it has been discovered that when an organic disulfide is reacted with elemental phosphorus in the presence of a base catalyst and in a dipolar aprotic solvent reaction medium, organic trithiophosphites are produced in high yield at lower temperatures and in shorter reaction times than heretofore possible. In addition to the obvious economic savings attendant with substantially reduced reaction time and temperature, the mild reaction conditions that can be employed permit the use of heat sensitive reactants that would be destroyed at temperatures of 150°–250° C.

The overall reaction that occurs in the process of the invention can be depicted by the following equation:

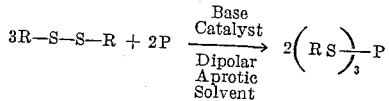

$$3R\text{—}S\text{—}S\text{—}R + 2P \xrightarrow[\text{Aprotic Solvent}]{\text{Base Catalyst} \atop \text{Dipolar}} 2(RS)_3P$$

wherein R represents an organic group.

The elemental phosphorus can be employed in the form of white, red or black phosphorus. It is preferred to employ white phosphorus since it is the most reactive. The common yellow phosphorus, which is white phosphorus containing a small proportion of red phosphorus, can also be employed to good advantage. It is preferred to employ the phosphorus in powdered form when the reaction is carried out below the melting point of white phosphorus (i.e., below about 44° C.). It will be apparent to those skilled in the art that the phosphorus must be kept from contact with oxygen. The use of an inert atmosphere such as nitrogen to blanket the reaction is one convenient method for accomplishing this purpose.

The second reactant is an organic disulfide, which can be employed singly or in mixtures of two or more disulfides. Any organic compound that contains a disulfide group, i.e., a —S—S— group, can be employed in the process of the invention provided that the organic compound does not contain any group other than the —S—S— group that is reactive with phosphorus, and further provided that the organic compound does not contain any reactive hydrogen. A reactive hydrogen is herein defined as a hydrogen atom that can form a hydrogen bond or a covalent bond with an acceptor atom such as nitrogen, oxygen, and fluorine atoms.

The disulfides can be represented in simplification by Formula I:

I 

R—SS—R wherein each R individually represents an organic group. Representative examples of such organic groups include alkyl such as methyl, ethyl, propyl, butyl, pentyl, hexyl, heptyl, octyl, nonyl, decyl, undecyl, dodecyl, tridecyl, tetradecyl, octadecyl, and the like; alkenyl such as vinyl, allyl, butenyl, octenyl, oleyl, linoleyl, linolenyl, arachidonyl, palmitoleyl, eleostearyl, licanyl, and the like. Also useful are cycloaliphatic groups such as cyclopentyl, cyclohexyl, bicyclo[2.2.1]hept-3-enyl, cyclopentenyl, cycloheptyl, and the like. Aromatic groups are also useful, for instance, phenyl, naphthyl, tolyl, benzyl, xylyl, biphenyl, and the like. In addition, the organic groups can be interconnected such that the —S—S— function forms part of a heterocyclic ring structure. In many cases, the organic disulfide can contain substituent groups such as ether oxygen, carbonyl, carbonyloxy, nitro, nitroso, tertiary amino, halo (preferably chloro, bromo, or iodo), cyano, sulfoxide, sulfone, thio, thione, azido, triazo, and the like. It is preferred to avoid substituent groups that contain reactive hydrogen such as primary amino, alcoholic or phenolic hydroxyl, sulfhydryl, carboxylic acid, aldehyde, or the like, since a labile hydrogen has a rate-diminishing influence on the reaction between the disulfide and phosphorus.

Specific illustrative organic disulfides that can be employed in the invention include the dialkyl disulfides such as dimethyl disulfide, methyl ethyl disulfide, diethyl disulfide, diisopropyl disulfide, dibutyl disulfide, dipentyl disulfide, dihexyl disulfide, diheptyl disulfide, dioctyl disulfide, dinonyl disulfide, didecyl disulfide, didodecyl disulfide, ditetradecyl disulfide, dioctadecyl disulfide and the like. The organic disulfides that contain one or more alkenyl groups are useful for instance divinyl disulfide diallyl disulfide, 1-propenyl 2-butyl disulfide, allyl propyl disulfide, dioleyl disulfide, dilinoleyl disulfide, dilinolenyl disulfide, and the like. Also highly desirable in the practice of the invention are the aromatic disulfides such as diphenyl disulfide, ditolyl disulfide, dinaphthyl disulfide, dibenzyl disulfide, and the like. Heterocyclic compounds containing the —S—S— group in the ring are also useful, for instance, 1,2-dithiolan (trimethylene disulfide), 1,2-dithiole-3-thione

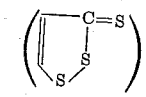

benzo-1,2-dithiol-3-one

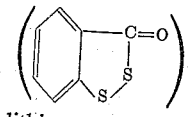

1-methylbenzo-2,3-dithiene

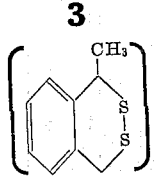

diphenylene-2,2′-disulfide

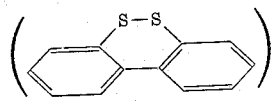

polymethylene disulfides of the formula

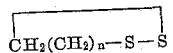

wherein n=5 to 13, 1,2,5-trithiapan

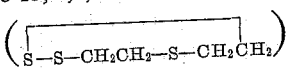

1,4,5-oxadithiapan

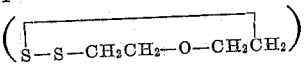

1,3-dioxa-6,7-dithiacyclononane

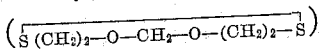

1,2,6,7-tetrathiacyclodecane (in this case, polymeric trithiophosphites are usually obtained because of the multifunctionality of the reactants), and the like. In many cases various cycloaliphatic disulfides are useful in the process of the invention, for instance, di(2-cyclohexenyl) disulfide, dicyclopentyl disulfide, dicyclohexyl disulfide, and the like.

Many organic disulfides that contain various substituent groups can be employed in the invention. Specific illustrative examples include di(nitrophenyl) disulfide, di(methoxyphenyl) disulfide, di(methylcarbonyloxymethyl) disulfide, diacetonyl disulfide, di(N,N-dimethylaminoyl) disulfide, di(3-sulfolanyl) disulfide, di(3-chlorophenyl) disulfide, di(3-cyanocyclohexyl) disulfide, cyclohexyl) disulfide, di(3-cyanocyclohexyl) disulfide, and the like.

Organic disulfides are a known class of compositions that can be prepared by known methods. The organic disulfides and their methods of preparation can be found in many literature articles, for instance, "Organic Chemistry of Bivalent Sulfur," volume III, by E. E. Reid, Chemical Publishing Company, Inc., New York, N.Y. (1960). It is within the scope of the invention to employ organic polysulfides in lieu of or in conjunction with the organic disulfides.

An important feature of the subject invention is the use of a dipolar aprotic solvent as a reaction medium. As used herein, the term "dipolar aprotic solvent" is meant to include any organic liquid that has a dielectric constant greater than 15 at 20° C. and which cannot donate suitably labile hydrogen atoms to form strong hydrogen bonds with an appropriate anionic species. Dipolar aprotic solvents are discussed and defined in an article by A. J. Parker, Quarterly Reviews, 16, 163 (1962). Among the solvents that can be employed are ketones such as acetone and acetophenone, nitriles such as acetonitrile and benzonitrile, sulfoxides such as dimethyl sulfoxide and diethyl sulfoxide, sulfones such as tetramethylene sulfone (sulfolane), amides such as N,N-dimethylformamide and N,N-dimethylacetamide, nitro compounds such as nitromethane and nitrobenzene, and the like. Preferred solvents are acetone, dimethyl sulfoxide, acetonitrile, and N,N-dimethylformamide.

Another important feature of the invention is the use of a base catalyst. As used herein, the term "base catalyst" refers to a composition that is basic according to the well known Brönsted-Lowry acid-base theory wherein a base is a substance that will associate a proton. The base catalyst employed will preferably have a structure that is represented by the formula:

$$R'_k X_m M_n$$

wherein R′ is hydrogen or an organic group such as alkyl, alkenyl, alkynyl, aryl groups and derivatives thereof; X is a Group V-A nonmetallic element in the periodic chart of the elements such as nitrogen, phosphorus, and arsenic or a Group VI-A nonmetallic element such as oxygen, sulfur, and selenium; M is a Group I-A metallic element such as lithium, sodium, potassium, rubidium and cesium, or a Group II-A metallic element such as beryllium, magnesium, calcium, strontium and barium; $k$ is an integer having a value of 1 or 2; $m$ is an integer having a value of 0, 1, or 2; $n$ is an integer having a value of 1 or 2; and the values of $k$, $m$, and $n$, are determined by the valence states of R′, X, and M, respectively. Among the base catalysts that can be employed there can be mentioned organometallic compounds such as butyllithium, phenylsodium, vinylpotassium, the Grignard reagents, and the like; metal hydroxides such as sodium hydroxide, potassium hydroxide, calcium hydroxide, and the like; metal alkoxides and aryloxides such as sodium methoxide, potassium phenoxide, magnesium ethoxide, and the like; metal mercaptides such as sodium methyl mercaptide, potassium benzene mercaptide, magnesium ethyl mercaptide, and the like; metal amides such as sodium amide, calcium amide, potassium N,N-dimethylamide, and the like; metal phosphides such as lithium diphenylphosphide, potassium bis(ethylthio)phosphide, potassium phenylphenoxyphosphide, metal hydrides such as sodium hydride, and the like. In general, the anion bases useful as catalysts in the subject invention have $pK_A$ values greater than 7. The Group I-A and II-A metals readily react with protic molecules such as water, alcohols, and mercaptans to form certain anion bases described above, for example, sodium metal reacts with water to give sodium hydroxide; hence use of catalytic quantities of a protic compound and a metal selected from Group I-A and II-A metals as the base catalyst is within the scope of this invention. The catalysts are preferably dissolved in suitable solvents. Ordinarily the organic group R′ will not have more than 18 carbon atoms, preferably not more than 10 carbon atoms, and more preferably not more than 6 carbon atoms.

In carrying out the process of the invention it is preferred to employ either stoichiometric quantities or a slight excess thereof the organic disulfide. The stoichiometry is calculated on the basis of the equation:

$$3R-S-S-R + 2P \rightarrow 2(RS)_3P$$

Therefore, it is preferred to employ an amount about equal to or slightly more (i.e., about 1 to 30 mole percent excess) than 1.5 molar equivalents of organic disulfide per atom equivalent of phosphorus. Other proportions are operative, although the use of an excess of phosphorus results in side reactions that are normally undesired. On the other hand, a large excess of organic disulfide would usually be economically undesirable, although the process is still operative with such proportions.

The proportion of the dipolar aprotic solvent can be varied widely. For instance, the solvent can constitute at least about 15 mole percent, and preferably at least 25 mole percent, of the total reaction mixture, up to, for example, about 95 mole percent of the reaction mixture.

The base catalyst is employed in catalytic amounts, for example, from about 0.01 to 10 mole percent, and preferably from about 0.05 to 5 mole percent, the percentage being based upon phosphorus. If there are any acidic impurities present in the reaction system, larger quantities of the base catalyst are required to offset any loss due to neutralization.

It is permitted to have a small proportion (e.g., up to about 5 mole percent, based upon the weight of dipolar aprotic solvent) of protic impurities such as water, methanol, and the like, in the reaction mixture. More than this amount is normally to be avoided since protic substances exert a rate-diminishing effect upon the reaction, and often cause side reactions such as generation of phosphorus acids which destroy the base catalyst. It is preferred, however, to carry out the reaction under substantially anhydrous conditions.

The method of carrying out the reaction is not narrowly critical. For instance, a convenient method is to add the catalyst to a stirred mixture containing dipolar aprotic solvent, elemental phosphorus and organic disulfide. If the reaction is carried out at a temperature below the melting point of white phosphorus (44° C.), it is preferred that the phosphorus be in a finely divided form.

The reaction can be carried out over a broad temperature range. The maximum temperature at which the process of the invention is carried out is preferably that temperature at which pyrolysis of the trithiophosphite product occurs. This varies slightly, depending upon the nature of the reactants, but is usually about 210° C. One of the major advantages of the subject invention is that the reaction can be carried out at temperatures substantially lower than heretofore possible. It is therefore desirable to conduct the reaction at temperatures below about 140° C., and more preferably, below about 100° C. In many cases, the reaction can be carried out at a temperature below the melting point of white phosphorus (i.e., 44° C.). The inventive process can be carried out at very low temperatures, although at temperatures below, for example, −50° C. the reaction becomes very slow. A highly preferred temperature range is from about 20° to about 60° C.

It is one of the unexpected features of the invention that the reaction of organic disulfide with elemental phosphorus to form an organic trithiophosphite can be carried out at temperatures below the homolysis temperature of the organic disulfide, which is usually about 140° C. The homolysis temperature is that temperature at which the following reaction occurs:

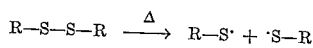

The process of the invention is carried out for a period of time sufficient to produce organic trithiophosphite. It is another valuable advantage of the invention that the reaction can produce high yields (e.g., up to 95 percent or more) in only a few minutes, whereas heretofore it was necessary to carry out the reaction for many hours. With the subject invention, reaction times as short as 5 minutes or less are possible, and the reaction is normally complete within one hour. Longer reaction times may be necessary in some cases, especially when the reactions must be carried out at a very low temperature due to the presence of a heat-sensitive substituent on the organic disulfide. In almost all cases, however, the reaction will be complete within about 2 hours.

The reaction can be carried out at atmospheric pressure, although reduced pressure or superatmospheric pressure can be employed if desired. As a practical matter, atmospheric pressure will almost always be employed. It is pointed out that an inert atmosphere such as nitrogen should blanket the reaction mixture in order to prevent contact of phosphorus with oxygen.

Conventional reaction equipment can be used. For instance, a reactor equipped with agitator and conventional heat transfer means can be used. The equipment can be constructed of stainless steel, glass, or other standard material.

The product can be recovered by simply removing the solvent and unreacted starting material by conventional means such as distillation, and the like.

The organic trithiophosphites that are produced by the process of the invention are useful materials. For instance, many of the trithiophosphites can be employed as extreme pressure additives for lubricating oils. Other uses include gasoline additives, flame-proofing agents, plasticizers, antioxidants, biocides, defoliants, hypergolic fuel additives, and chemical intermediates, for example, the trithiophosphites can be reacted with oxygen or with sulfur according to the reactions:

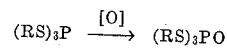

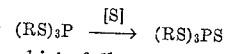

The examples which follow illustrate various aspects of the invention.

EXAMPLE 1

To a stirred mixture of 1.55 grams (50 milligram atoms) of finely divided yellow phosphorus, 13.4 grams (75 millimoles) of dibutyl disulfide, and 30 milliliters of dimethyl sulfoxide under a blanket of nitrogen, there was added 5 milliliters of dimethyl sulfoxide containing 40 milligrams (0.4 millimole) of potassium ethylmercaptide. The reaction was moderately exothermic and was maintained at 27–28° C. by cooling as needed. After 40 minutes, the phosphorus was completely consumed. The reaction mixture was stirred an additional 30 minutes at room temperature, and then was poured into water. The organic layer was taken up in diethyl ether, which was fractionally distilled to yield 12.5 grams of tributyl trithiophosphite B.P. 144° .3 mm. Hg, $n_D^{30}$ 1.5460. This represents a yield of 86.5 percent of the theoretical. Elemental analysis of the product was as follows:

Calculated for $C_{12}H_{27}S_3P$, percent: C, 48.28; H, 9.12; S, 32.22; P, 10.38. Found, percent: C, 48.39; H, 9.04; S, 32.54; P, 10.16.

EXAMPLES 2–11

A series of experiments were conducted which illustrates the effect of various solvents upon the reaction of dibutyl disulfide with yellow phosphorus in the presence of potassium hydroxide catalyst. In each experiment, 1.55 grams of finely divided yellow phosphorus was stirred with 13.4 grams of dibutyl disulfide in 30 milliliters of the solvent indicated in Table I below. The solvents employed are identified as follows:

DMSO—Dimethyl sulfoxide
ACN—Acetonitrile
DMF—N,N-dimethylformamide
DMK—Acetone
THF—Tetrahydrofuran
pDO—1,4-dioxane
MeOH—Methanol The chart below depicts the solvent employed, the dielectric constant at 20° C. for each solvent, various reaction variables, and the yield for each experiment:

CHART I.—SOLVENT EFFECTS ON REACTION OF ORGANIC DISULFIDE WITH PHOSPHORUS

| Ex. | Solvent | Dielectric Constant | Catalyst | Temp., °C. | Time | Yield, Percent |
|---|---|---|---|---|---|---|
| 2 | DMSO | 45.0 | KOH [1] | 29–30 | 40 min | 93 |
| 3 | ACN | 37.5 | KOH [1] | 29–32 | 12 min | 90 |
| 4 | ACN | 37.5 | KOH [2] | 25–30 | 10 min | 80 |
| 5 | DMF | 38.9 | KOH [1] | 30–36 | 30 min | 94 |
| 6 | DMK | 21.2 | KOH [2] | 30 | 5 min | 90 |
| 7 | THF | 8.2 | KOH [1] | 38–45 | 17.5 hr | 4 |
| 8 | THF | 8.2 | KOH [2] | 30–40 | 2 hr | 0 |
| 9 | pDO | 2.2 | KOH [1] | 40–45 | 5.5 hr | 0 |
| 10 | pDO | 2.2 | KOH [2] | 45–50 | 4 hr | 0 |
| 11 | MeOH | 33.6 | KOH [1] | 40–50 | 69 hr | 7 |

[1] 20 milligrams of KOH refluxed in 10 milliliters of the solvent for 16 hours, and the resultant saturated solution used as the catalyst.
[2] 0.1 milliliter of 10 N aqueous KOH.

It is noted that when the reaction is carried out in a dipolar aprotic solvent having a dielectric constant of at least 15, yields of up to 94 percent are obtained within minutes. With solvents having dielectric constants below 15, very low yields, if any, are obtained. Also, the use of a protic solvent (methanol) results in a very low yield.

EXAMPLES 12–21

A series of experiments were conducted which illustrate the effect of various catalysts on the reaction between dialkyl disulfide and finely divided yellow phosphorus. The ratio of reactants was the same as was employed in the previous examples. Table II below identifies the catalyst employed and various reaction variables for Examples 12–21:

TABLE II.—EFFECT OF CATALYSTS ON REACTION OF DIALKYL DISULFIDE WITH ELEMENTAL PHOSPHORUS

| Ex. | Solvent | R[1] | Catalyst | Mol Percent of Catalyst, Based on P | Temp., °C. | Time | Yield, Percent |
|---|---|---|---|---|---|---|---|
| 12 | DMSO | Bu | KSEt[2] | 0.8 | 27–28 | 40 min | 87 |
| 13 | DMSO | Bu | KOH[3] | 0.7 | 29–30 | 40 min | 93 |
| 14 | DMK | Et | KOH[4] | 1 | 29–35 | 6 min | 87 |
| 15 | DMSO | Et | KOMe[5] | 0.5 | 23–33 | 10 min | 86 |
| 16 | DMSO | Et | BuLi[6] | 0.5 | 30–35 | 20 min | 80 |
| 17 | ACN | Et | NaF[7] | 6.8 | 35–50 | 1 hr | 0 |
| 18 | DMK | Bu | KI[8] | 1.7 | 30–45 | 1 hr | 0 |
| 19 | ACN | Bu | NaCN[9] | 2 | 30–45 | 1 hr | 0 |
| 20 | ACN | Et | KOP(OEt)$_2$[10] | 0.2 | 74–75 | 1 hr | 0 |
| 21 | DMK | Et | P(OEt)$_3$ | 0.8 | 60–61 | 2 hr | 0 |

[1] In the formula R—SS—R, R is either butyl (Bu) or ethyl (Et).
[2] 5 ml. of 0.08 N potassium ethyl mercaptide in DMSO.
[3] See footnote [1] in Table I.
[4] 0.05 ml. of 10 N aqueous KOH.
[5] 0.05 ml. of 6 N methanolic potassium methoxide.
[6] 0.1 ml. of 20 weight percent butyllithium in hexane.
[7] 0.56 ml. of 6 N aqueous sodium fluoride.
[8] 0.17 ml. of 5 N aqueous potassium iodide.
[9] 0.1 ml. of 10 N aqueous sodium cyanide.
[10] 0.2 ml. of 0.5 N potassium diethyl phosphite in diethyl phosphite.

EXAMPLE 22

Elemental phosphorus and diphenyl disulfide were reacted in acetone in a manner analogous to that described in Example 1, with the exception that 0.1 milliliter of 10 N aqueous potassium hydroxide was employed as the catalyst. The reaction was complete in 40 minutes (as evidenced by disappearance of the phosphorus) at 30°–35° C. Triphenyl trithiophosphite, M.P. 76–7° C., was obtained in 89 percent yield.

EXAMPLE 23

Yellow phosphorus and dimethyl disulfide were reacted in refluxing acetone in a manner analogous to that decribed in Example 1, with the exception that 0.3 milliliter of 15 N aqueous potassium hydroxide was employed as the catalyst. The reaction was complete within 5 minutes at 58–60° C. Trimethyl trithiophosphite, B.P. 85–90°/0.2 mm. Hg, $n_D^{30}$ 1.6397, was isolated in 96 percent yield by distillation.

EXAMPLE 24

Yellow phosphorus and diethyl disulfide were reacted in dimethyl formamide at 3° C. in a manner analogous to that described in Example 1, with the exception that 0.1 milliliter of 6 N methanolic sodium methoxide was used as the catalyst. The reaction was complete in 40 minutes at 3° C. Water was added to separate the product from dimethyl formamide. Distillation of the product gave triethyl trithiophosphite, B.P. 85°/0.2 mm. Hg, $n_D^{30}$ 1.5850, in 85 percent yield.

EXAMPLE 25

To a stirred mixture of 1.55 grams of yellow phosphorus in 30 milliliters of dimethyl sulfoxide that was at 170° C., there was added 17.8 grams of dibutyl disulfide. The mixture dropped to about 140° C. and was immediately heated to 168° C. At this point, 0.1 cubic centimeter of 15 N aqueous potassium hydroxide was added to the reaction mixture. The reaction mixture was maintained at 168° C. for 5 minutes, and then was rapidly cooled to room temperature. The reaction mixture had separated into two layers, and the top layer was analyzed by vapor phase chromatography.

Concurrently with the above-described experiment, a parallel reaction was run under identical conditions except that no base catalyst was added. A comparison of the vapor phase chromatographic analyses of the top layers of each of these reaction mixtures revealed that the reaction rate of the catalyzed reaction was 20.4 times greater than the reaction rate of the uncatalyzed reaction.

What is claimed is:

1. Process that comprises reacting an organic disulfide with elemental phosphorus in the presence of a base catalyst, in a dipolar aprotic solvent reaction medium to produce an organic trithiophosphite.

2. The process of claim 1 wherein the dipolar aprotic solvent is a member selected from the group consisting of ketones, nitriles, sulfoxides, sulfones, amides, and nitro compounds.

3. The process of claim 1 wherein the reaction temperature is below the pyrolysis temperature of the organic trithiophosphite product.

4. The process of claim 1 wherein the organic disulfide is a dialkyl disulfide.

5. The process of claim 4 wherein said dialkyl disulfide is diethyl disulfide.

6. The process of claim 4 wherein said dialkyl disulfide is dibutyl disulfide.

7. The process of claim 4 wherein said dialkyl disulfide is dimethyl disulfide.

8. The process of claim 1 wherein the organic disulfide is a diaryl disulfide.

9. The process of claim 8 wherein said diaryl disulfide is diphenyl disulfide.

10. The process of claim 1 wherein the elemental phosphorous is essentially white phosphorus and wherein the process is carried out at a temperature between −50° and +140° C.

11. The process of claim 1 wherein the base catalyst is a composition of the formula:

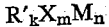

$$R'_k X_m M_n$$

(a) wherein R' is a member of the group consisting of hydrogen, alkyl, alkenyl, alkynyl, and aryl,
(b) wherein X represents a nonmetallic element selected from the group consisting of the Group V–A and the Group VI–A elements of the Periodic Table,
(c) wherein M represents a metallic element selected from the group consisting of the Group I–A and the Group II–A elements of the Periodic Table,
(d) wherein $k$ is an integer having a value in the range of from 1 to 2,
(e) wherein $m$ is an integer having a value in the range of from 0 to 2, and
(f) wherein $n$ is an integer having a value in the range of from 1 to 2.

12. The process of claim 1 wherein the base catalyst is an alkali metal hydroxide.

13. The process of claim 1 wherein the base catalyst is an alkali metal alkoxide.

14. The process of claim 1 wherein the base catalyst is an alkali metal alkyl.

15. The process of claim 1 wherein the base catalyst is alkali metal alkyl mercaptide.

16. The process of claim 12 wherein the alkali metal hydroxide is potassium hydroxide.

17. The process of claim 1 wherein the dipolar aprotic solvent is dimethyl sulfoxide.

18. The process of claim 1 wherein the dipolar aprotic solvent is acetone.

19. The process of claim 1 wherein the dipolar aprotic solvent is acetonitrile.

20. The process of claim 1 wherein the dipolar aprotic solvent is N,N-dimethylformamide.

References Cited
UNITED STATES PATENTS

| | | | |
|---|---|---|---|
| 2,542,370 | 2/1951 | Stevens et al. | 260—971 |
| 2,819,290 | 1/1958 | McLeod et al. | 260—971 |

CHARLES B. PARKER, *Primary Examiner.*

A. H. SUTTO, *Assistant Examiner.*